United States Patent [19]
Pantale et al.

[11] Patent Number: 5,150,772
[45] Date of Patent: Sep. 29, 1992

[54] DISC BRAKE CALIPER WITH AN INTEGRAL PROPORTIONING VALVE

[75] Inventors: David Pantale, Epinay Surseine; Eric Schonenberger, Bois Colombes, both of France

[73] Assignee: General Motors France, Gennevilliers, France

[21] Appl. No.: 630,994

[22] Filed: Dec. 19, 1990

[30] Foreign Application Priority Data

Jan. 23, 1990 [GB] United Kingdom ............... 9001565

[51] Int. Cl.⁵ .......................................... F16D 55/18
[52] U.S. Cl. ................................... 188/72.4; 188/370
[58] Field of Search ............... 188/72.4, 151 R, 152, 188/349, 354, 370; 303/9.75, 9.62, 84.1; 60/591

[56] References Cited

U.S. PATENT DOCUMENTS

| | | | |
|---|---|---|---|
| 3,384,204 | 5/1968 | Swift | 188/72.4 X |
| 3,651,900 | 3/1972 | Feikema | 188/72.4 X |
| 4,257,496 | 3/1987 | Fujita et al. | 188/72.6 |
| 4,267,903 | 5/1981 | Kita et al. | 188/72.6 |
| 4,435,021 | 3/1984 | Hoenick | 188/72.4 X |
| 4,535,873 | 8/1985 | Airheart | 188/72.4 |
| 4,629,039 | 12/1986 | Imoto et al. | 188/72.4 X |
| 5,020,864 | 6/1991 | Tanaka | 303/84.1 X |
| 5,024,298 | 6/1991 | Schenk et al. | 188/72.2 |

FOREIGN PATENT DOCUMENTS

| | | |
|---|---|---|
| 1430226 | 11/1969 | Fed. Rep. of Germany . |
| 3636443 | 5/1988 | Fed. Rep. of Germany ...... 188/349 |
| 0102935 | 4/1990 | Japan .................... 188/72.4 |
| 2082678 | 3/1982 | United Kingdom . |
| 2175071 | 11/1986 | United Kingdom ............... 303/9.75 |

*Primary Examiner*—Robert J. Oberleitner
*Assistant Examiner*—Josie A. Ballato
*Attorney, Agent, or Firm*—Ernest E. Helms

[57] ABSTRACT

A disc braking (10) for a motor vehicle comprising a rotor (12); inner and outer brake pads (14,16) disposed on opposite sides of the rotor and movable into brake engagement therewith; a caliper (18) comprising a piston (26) for urging one of the brake pads against the rotor, a caliper housing (28) having a cylinder (32) positioned on one side of the rotor within which the piston is slidably movable under the action of fluid pressure in the cylinder, and a fluid line (34) in the caliper for supplying fluid to the cylinder for movement of the piston; and a proportioning valve (44) in the fluid line and integral with the caliper for preventing fluid pressure above a predetermined level acting on the piston. Reduces risk of wheel lock on braking. Provides a unitary caliper and proportioning valve prior to installation on a motor vehicle.

3 Claims, 10 Drawing Sheets

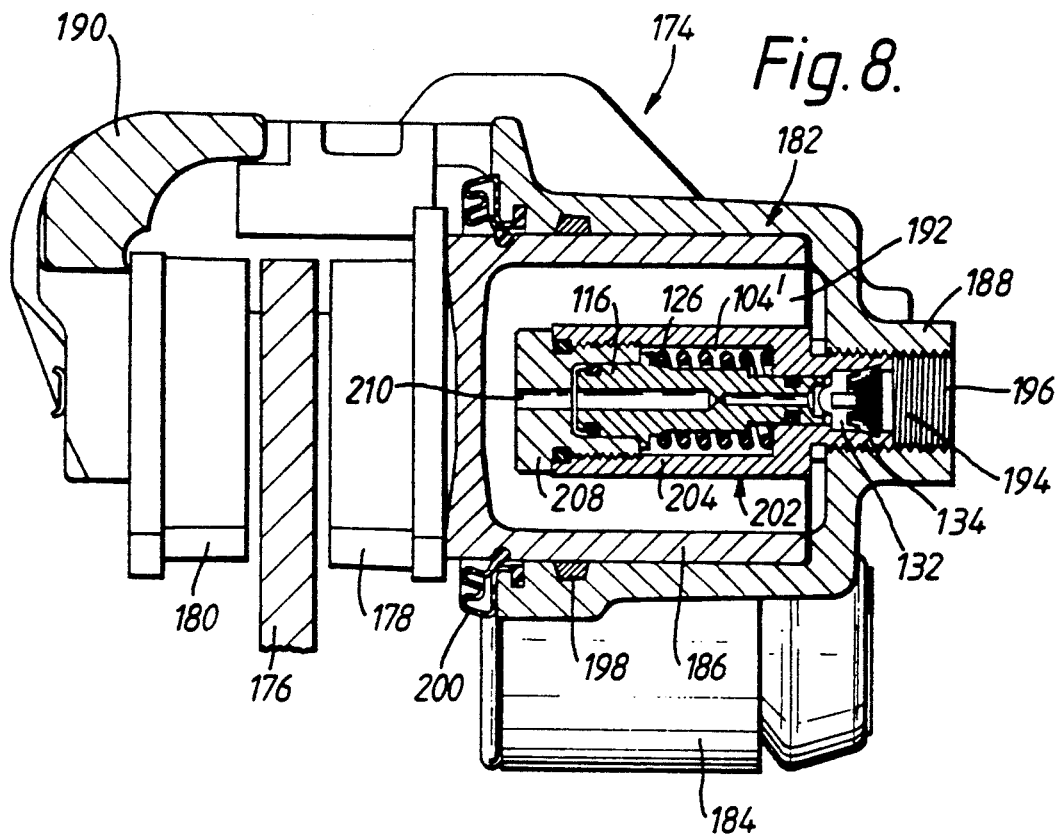
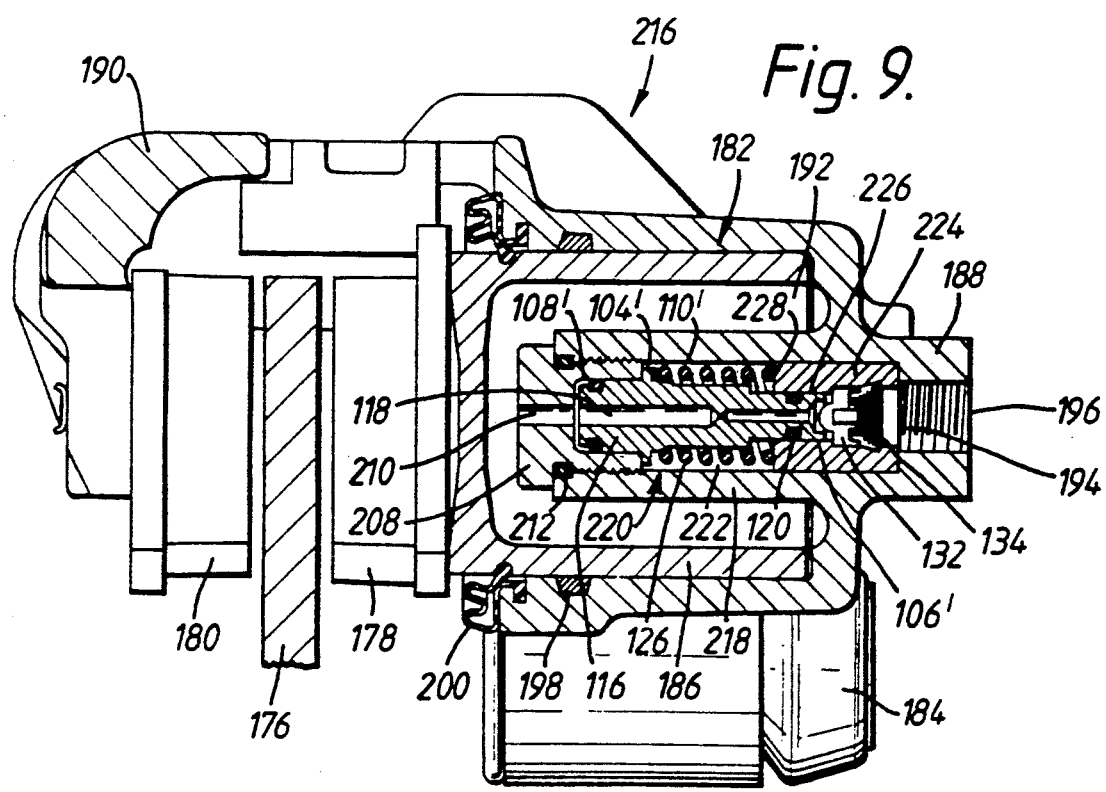

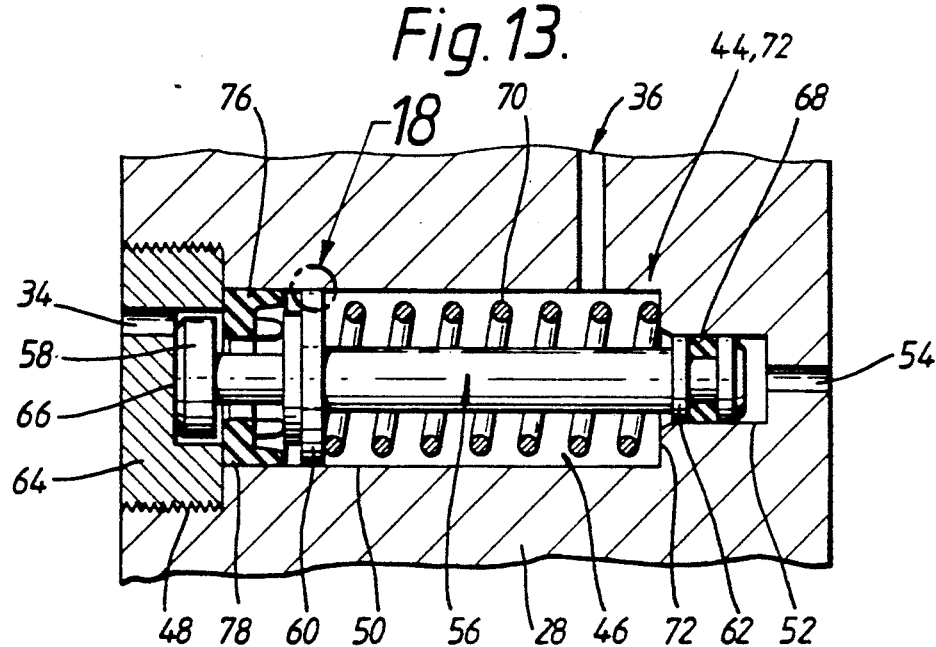
Fig. 13.
Fig. 18.
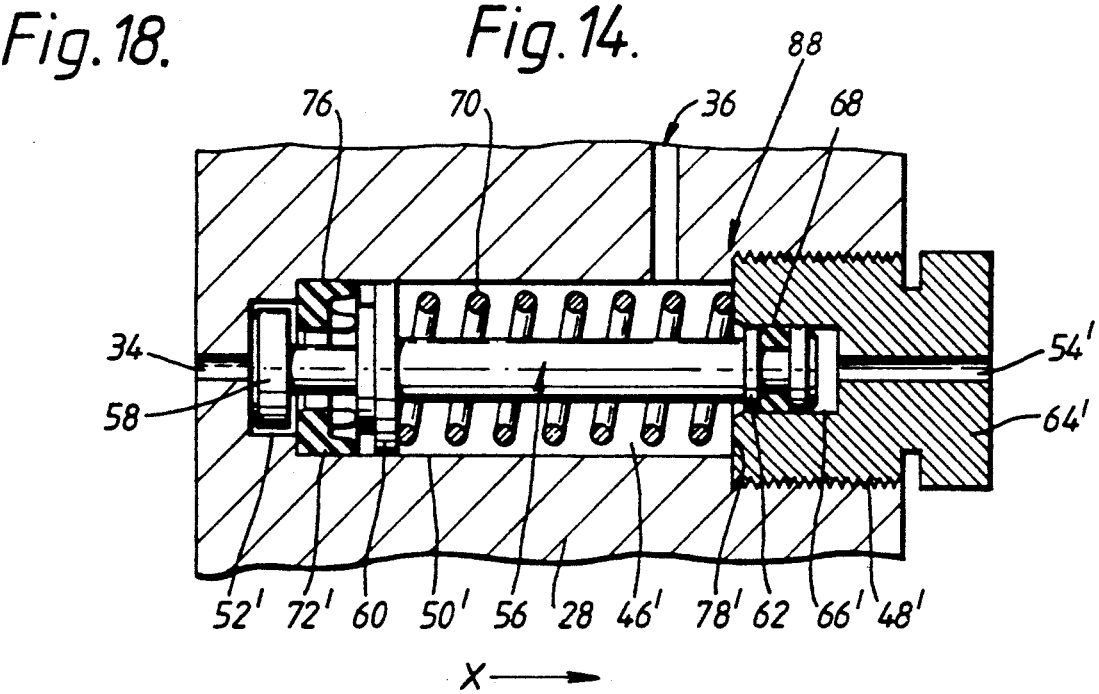
Fig. 14.

DISC BRAKE CALIPER WITH AN INTEGRAL PROPORTIONING VALVE

This invention relates to a disc brake for a motor vehicle, and in particular to a disc brake caliper having means for limiting the fluid pressure applied thereto.

It is well known on motor vehicles to provide a disc brake comprising a rotor, inner and outer brake pads, and a caliper housing. Generally, there are two types of disc brake, one having a fixed caliper housing, the other having a moving caliper housing. In the former case, for each brake pad, the caliper housing has a cylinder in which a piston is slidably mounted for urging the respective brake pad into braking engagement with the rotor. The pistons are moved by fluid pressure (generated in the brake system of the motor vehicle) within the cylinders. The cylinders are interconnected so that an equal fluid pressure acts on each piston. In certain cases, two pistons may act on each brake pad. In the case of a moving caliper housing, the caliper housing has one or more cylinders in each of which a piston is slidably mounted for urging the inner brake pad into braking engagement with the rotor, and an arm member for urging the outer brake pad into engagement with the rotor by reactive force on actuation of the piston. The present invention is concerned with either type of disc brake.

It is also well known on motor vehicles to provide, in the braking system of the motor vehicle, at least one hydro-mechanically actuated proportioning valve. The proportioning valve or valves act to limit the fluid pressure presented to the rear wheel brakes of the motor vehicle. Such proportioning valves substantially prevent the rear wheels from locking. Several types of proportioning valve are known. These include pressure sensitive, load or height sensitive, and inertia sensitive. In general, a pressure sensitive proportioning valve comprises a valve piston acted on by a spring and by fluid pressure in opposition to one another. During normal operation, the spring force is greater than the fluid pressure, and the valve piston is positioned such that the proportioning valve remains open. As the fluid pressure increases, the pressure acts on the valve piston against the action of the spring. Once the fluid pressure reaches a predetermined level, the valve piston is moved (against the action of the spring) to close the proportioning valve, to prevent further increases in fluid pressure reaching the rearbrakes. Inertia sensitive proportioning valves act to restrict the fluid pressure presented to the rear brakes whenever a predetermined rate of deceleration of the motor vehicle is exceeded. Such proportioning valves usually comprise a ball rolling up an inclined slope which trips a spring loaded valve to a closed position once the predetermined deceleration is reached. Load or height sensitive proportioning valves respond to changes in the height of the rear suspension of the motor vehicle, and, usually by way of a spring loaded lever connected directly or indirectly to the rear axle of the motor vehicle, actuate the proportioning valve accordingly. In this case, the actuation of the proportioning valve is governed by both the load on the motor vehicle, and its deceleration, both of which affect the height of the rear suspension. In certain circumstances, proportioning valves may be associated with the front wheel brakes of a motor vehicle. The present invention is also concerned with any one of these types of proportioning valve.

It is an object of the present invention to provide a disc brake caliper with an associated proportioning valve for providing means for limiting the fluid pressure applied to the disc brake.

To this end, a disc brake for a motor vehicle in accordance with the present invention comprises a rotor; inner and outer brake pads disposed on opposite sides of the rotor and movable into braking engagement therewith; a caliper comprising a piston for urging one of the brake pads against the rotor, a caliper housing having a cylinder positioned on one side of the rotor within which the piston is slidably movable under the action of fluid pressure in the cylinder, the cylinder defining a single working chamber for the piston, and a fluid line in the caliper for supplying fluid from a fluid pressure source to the cylinder for movement of the piston; and a proportioning valve in the fluid line and integral with the caliper for limiting fluid pressure acting on the piston when the fluid pressure from the fluid pressure source exceeds a predetermined level.

As well as meeting the above defined object, the present invention has the advantage of providing a unitary caliper and proportioning valve prior to assembly on a motor vehicle. This arrangement therefore makes the installation of the braking system on the motor vehicle easier.

Preferably, the proportioning valve is integral with the caliper housing.

The caliper is preferably of the moving type, the caliper housing being slidably mountable on a support member and further comprising an arm member for urging the other brake pad against the rotor on movement of the piston to urge the said one brake pad against the rotor.

Alternatively, the caliper may be of the fixed type, in which case the caliper preferably further comprises a second piston for urging the other brake pad against the rotor, and the caliper housing is fixedly mountable on a support member and further comprises a second cylinder positioned on the other side of the rotor within which the second piston is slidably movable under the action of fluid pressure in the second cylinder, the fluid line supplying fluid to both cylinders at the same pressure.

Preferably, the proportioning valve is of the pressure sensitive type which closes when the fluid pressure in the cylinder or cylinders reaches the predetermined level. In this case, the proportioning valve preferably comprises a stepped bore; a valve seat positioned within the stepped bore; a valve member engageable with the valve seat to close the proportioning valve; a valve piston positioned in the stepped bore and axially movable relative thereto, the valve piston having either the valve seat or the valve member integral therewith; and a spring for normally biasing the valve piston to the open position of the proportioning valve. In this case, the valve member is preferably on the valve piston, and the valve seat is preferably defined by an elastomeric cup seal. In the case where the valve seat is on the valve piston, the valve member is preferably biased towards the valve seat.

Alternatively, the proportioning valve may be of the inertia sensitive type which closes when the motor vehicle exceeds a predetermined deceleration which corresponds to the fluid pressure reaching the predetermined level. As a further alternative, the proportioning valve may be of the load and height sensitive type which is actuated by the vehicle suspension, the proportioning valve closing when the height of the vehicle suspension exceeds a predetermined distance which corresponds to the fluid pressure reaching the predetermined level.

Preferably, the proportioning valve comprises a housing which makes a screw threaded connection with the caliper housing.

Alternatively, the proportioning valve may comprise a housing which is formed integrally in one piece with the caliper housing.

In either of the above cases, the housing of the proportioning valve preferably extends into the cylinder or one of the cylinders of the caliper housing.

Preferably, the proportioning valve is assembled by passing through an external opening in the caliper housing, the external opening being closed by an end cap.

Alternatively, the proportioning valve may be assembled by passing through the cylinder in the caliper housing prior to the piston being positioned in the cylinder.

The proportioning valve may be of the type which acts to prevent fluid pressure above the predetermined level reaching the working chamber of the or each piston. Alternatively, the proportioning valve may be of the type which limits or restricts the flow of fluid to the working chamber of the or each piston when the fluid pressure exceeds the predetermined level.

Preferably, the caliper includes a parking brake mechanism for moving the brake pads into braking engagement with the rotor independently of the fluid pressure.

The present invention also includes a caliper for use in a disc brake as herein defined.

The present invention will now be described, by way of example, with reference to the accompanying drawings, in which:

FIGS. 7 to 12 are cross-sectional views of fourth, fifth, sixth, seventh, eighth, and ninth embodiments respectively of disc brakes in accordance with the present invention.

FIGS. 13 to 17 are cross-sectional views of the proportioning valves associated with the disc brakes shown in FIGS. 1 to 12;

FIG. 18 is an enlargement of the encircled portion of FIG. 13.

Figure 1:
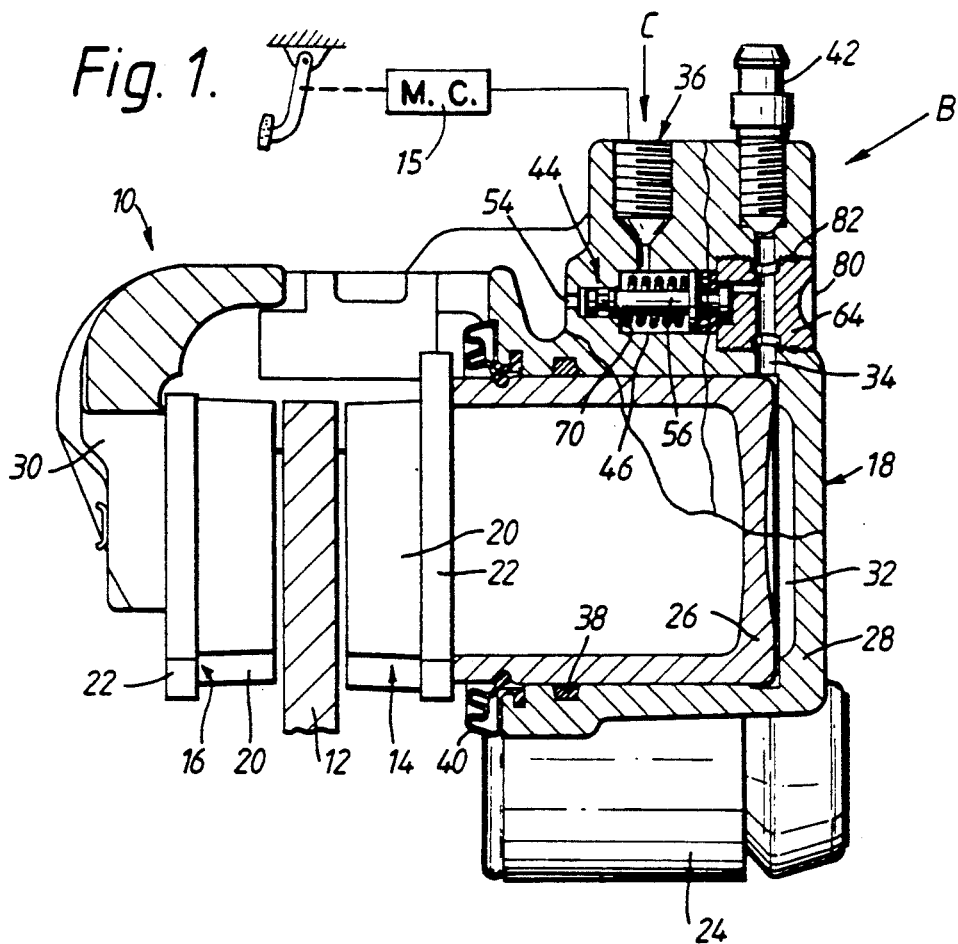
FIG. 1 is a cross-sectional view of a first embodiment of disc brake in accordance with the present invention taken on the lines A—A, B—B, and C—C of FIG. 2.
Figure 2:
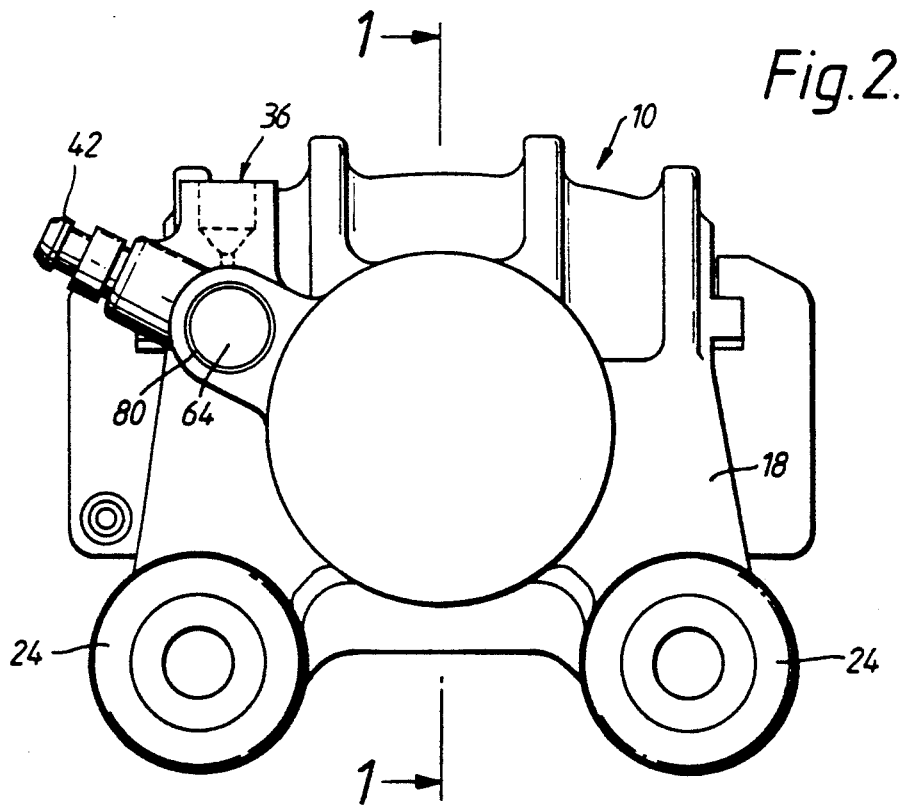
FIG. 2 is a end view of the disc brake of FIG. 1.

A disc brake 10 in accordance with a first embodiment of the present invention is shown in FIGS. 1 and 2. The disc brake 10 comprises a rotor 12, inner and outer brake pads 14,16 respectively disposed on opposite sides of the rotor, and a caliper 18. The inner and outer brake pads 14,16 each comprises friction material 20 mounted on a backing plate 22. In this embodiment, the caliper 18 is the moving or floating type and is slidably mounted on a support member (not shown, for example, a bracket or knuckle of the suspension/steering system of the motor vehicle) by way of sliding sleeves 24. The caliper 18 comprises a piston 26, a caliper housing 28 having an arm member 30 and a cylinder 32, and a fluid line 34. The fluid line 34 connects the cylinder 32 to a fluid inlet 36. The arm member 30 engages the backing plate 22 of the outer brake pad 16. The piston 26 is slidably mounted in the cylinder 32 and engages the backing plate 22 of the inner brake pad 14. The cylinder 32 defines a single working chamber for the piston 26. An elastomeric seal 38 between the piston 26 and the caliper housing 28 provides a fluid seal for the cylinder 32, and a flexible boot 40 substantially prevents ingress of dirt into the cylinder. A bleed nipple 42 is fluidly connected with the fluid line 34.

The disc brake 10 as thus far described is well known, and its operation is also well known to those skilled in the art, and will not be described in detail. In use, pressurized brake fluid from a fluid pressure source such a master cylinder 15 is introduced into the working chamber defined by the cylinder 32 by way of fluid inlet 36 and fluid line 34. The pressurized brake fluid in the cylinder 32 causes the piston 26 to move in an axial direction, which consequently urges the inner brake pad 14 into engagement with the rotor 12. By reactive force, the arm member 30 then moves the outer brake pad 16 into engagement with the rotor 12, such that the friction material 20 of the inner and outer brake pads 14,16 provides braking engagement with the rotor.

A proportioning valve 44 is positioned in a stepped bore 46 in the fluid line 34 in the caliper housing 28 between the fluid inlet 36 and the cylinder 32. The proportioning valve 44, which is of the pressure sensitive type, is shown in greater detail in FIG. 13. The stepped bore 46 has three sections 48,50,52, with the first section 48 having a larger diameter than the second section 50, and with the second section having a larger diameter than the third section 52. The third section 52 is connected to atmospheric pressure by way of an air vent 54. The second section 50 is fluidly connected to the fluid inlet 36 and defines a portion of the fluid line 34 in the caliper housing 28. A valve piston 56 extends through the three sections 48,50,52 of the stepped bore 46 and has first, second and third disc members 58,60,62 positioned in the first, second and third sections respectively of the stepped bore. The diameters of the disc members 58,60,62 are such as to allow the valve piston 56 to move axially relative to the stepped bore 46. The second disc member 60 makes a sliding fit in the second section 50 of the stepped bore 46, and the third disc member 62 makes a sliding fit in the third section 52 of the stepped bore. An end cap 64 closes the first section 48 of the stepped bore 46, and has a bore 66 therethrough which opens into the second section 50 of the stepped bore 46, which defines another portion of the fluid line 34, and within which the first disc member 58 of the valve piston 56 is positioned. An elastomeric seal 68 is positioned on the opposite side of the third disc member 62 to the second section 50 of the stepped bore 46 to form a fluid tight seal between the second section 50 and the air vent 54. A helical spring 70 is positioned in the second section 50 of the stepped bore 46 between a shoulder 72 (between the second and third sections 50,52 of the stepped bore) and one side of the second disc member 60. Positioned on the other side of the second disc member 60 within the second section 50 of the stepped bore 46 is an elastomeric cup seal 76 against which the second disc member abuts under the action of the helical spring 70. The elastomeric cup seal 76 is secured in position in the second section 50 of the stepped bore 46 between the second disc member 60 and an abutment shoulder 78 defined by the end cap 64.

The elastomeric cup seal 76 defines a valve seat engageable by a valve member defined by the first disc member 58 of the valve piston 56.

During normal operation of the disc brake 10, brake fluid can pass between the fluid inlet 36 and the cylinder 32 by way of the second section 50 of the stepped bore 46, past the outer edge of second disc member 60 via clearance gap 17 (FIG. 18), between the second disc member and the elastomeric cup seal 76, and through the bore 66. Initially, as the fluid pressure increases, the valve piston 56 remains stationary relative to the stepped bore 46. However, when the fluid pressure at the fluid inlet 36 exceeds a predetermined level, the valve piston 56 is moved in a direction X relative to the stepped bore 46 such as to compress the helical spring 70. This is due to the action of the fluid pressure on the third disc member 62. The movement of the valve piston 56 brings the first disc member 58 into engagement with the elastomeric cup seal 76 to provide a substantially fluid tight seal between the fluid inlet 36 and the cylinder 32 to prevent further increases in fluid pressure at the fluid inlet being passed on to the cylinder. The predetermined fluid pressure at which the proportioning valve 44 closes can be determined from the cross-sectional area of the third disc member 62 and the strength of the helical spring 70, and adjusted accordingly, in a manner well known to those skilled in the art. With this arrangement, the risk of a wheel brake locking due to an excessively high fluid pressure in the cylinder 32 is substantially eliminated. Excess fluid pressure generated in the cylinder 32 due to thermal expansion, etc. is relieved by seepage of brake fluid pass the outer periphery of the elastomeric cup seal 76 into the second section 50 of the stepped bore 46. Passage of brake fluid in the other direction is prevented by the design of the elastomeric cup seal 76. When the fluid pressure at the fluid inlet 36 falls below the predetermined level, the valve piston 56 moves back in the opposite direction to the direction X to open the proportioning valve 44.

In the arrangement shown in FIGS. 1 and 2, the first section 48 of the stepped bore 46 extends to an external opening 80 in the caliper housing 28, and the end cap 64 (which makes a threaded connection in the external opening) together with an elastomeric seal 82 sealingly close the opening after assembly of the proportioning valve 44 in the stepped bore 46, the end cap being screw threaded into position.

Figure 3:
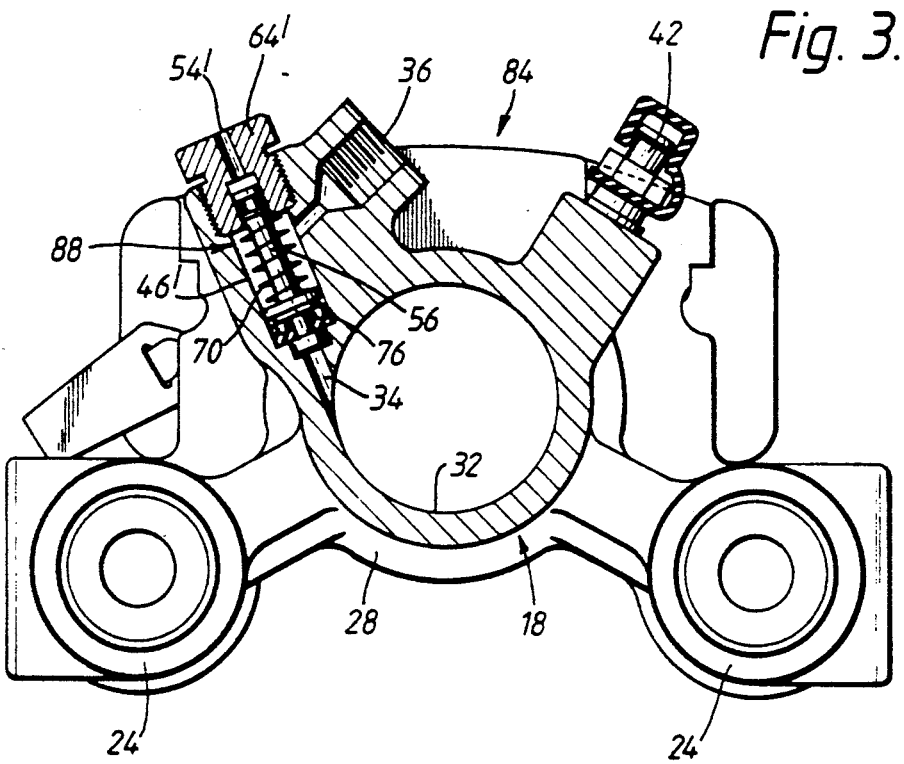
FIG. 3 is a end view, partly in cross-section, of a second embodiment of disc brake in accordance with the present invention.
Figure 4:
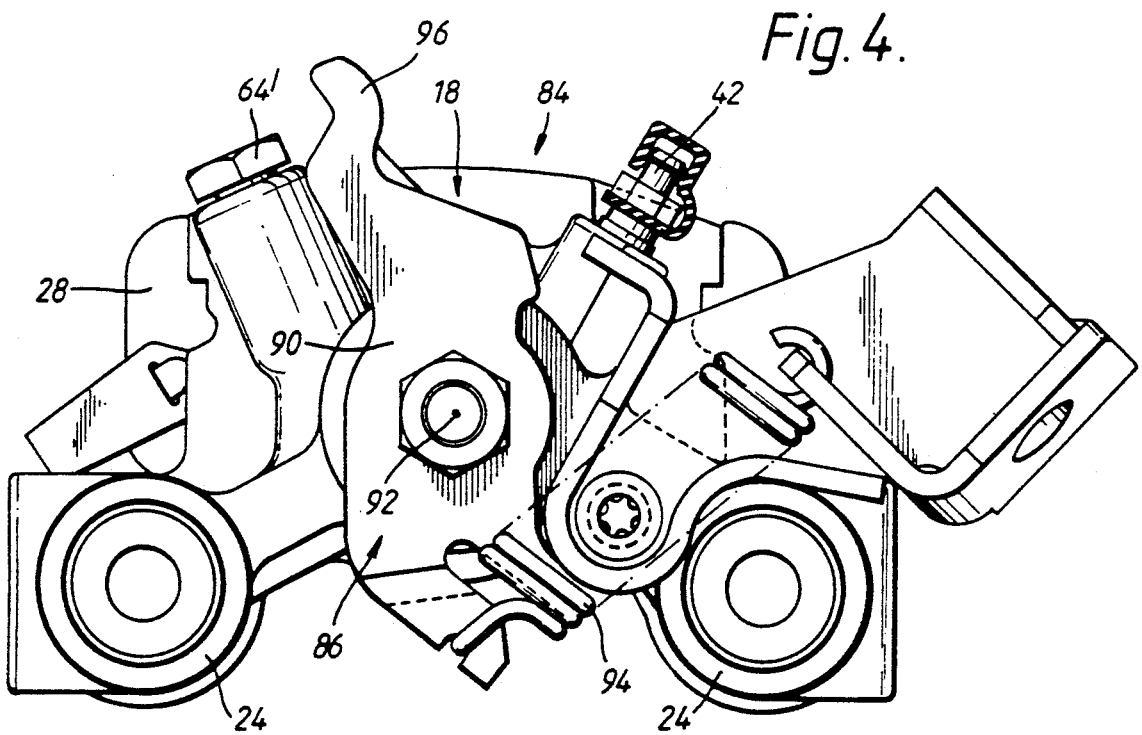
FIG. 4 is an end view of the disc brake of FIG. 3 including part of a parking brake mechanism.

Referring to FIGS. 3 and 4, a second embodiment of disc brake 84 in accordance with the present invention is shown. In this embodiment, items which perform the same function as those in the first embodiment in FIGS. 1 and 2 have been given the same reference numeral. The caliper 18 of this disc brake is the moving type. In this case, the disc brake 84 includes a parking brake mechanism 86 which can be mechanically actuated by the vehicle operator to move the inner and outer brake pads (not shown) into braking engagement with the rotor (not shown) by mechanically moving the piston (not shown). Further, the disc brake 84 includes a proportioning valve 88 in the fluid line 34 between the cylinder 32 and the fluid inlet 36.

The proportioning valve 88 will now be described in more detail with reference to FIG. 14. The proportioning valve 88 is substantially identical to the proportioning valve 44 shown in FIG. 13, and like parts have been given the same reference numeral. The main difference is that the disposition of the stepped bore 46' relative to the valve piston 56 has been reversed. In this case, the first disc member 58 is positioned in the third section 52' of the stepped bore 46', and the third disc member 62 makes a sliding sealing fit in the bore 66' in the end cap 64'. The end cap 64' is screw threaded into the first section 48' of the stepped bore 46' (after assembly of the proportioning valve 88), and has the air vent 54' connected with the bore 66'. In this arrangement, the elastomeric cup seal 76 abuts the shoulder 72' between the second and third sections 50',52' of the stepped bore 46', and one end of the helical spring 70 abuts the abutment shoulder 78' provided by the end cap 64'. The operation of the proportioning valve 88 is substantially the same as that of the proportioning valve 44 shown in FIG. 14.

The parking brake mechanism 86 (FIG. 4) comprises a lever 90 which pivots about an axis 92. Pivoting of the lever 90 moves the piston (not shown) of the disc brake 84 between the engaged and disengaged positions for the brake pads (not shown). A spring 94 biases the lever 90 to the disengaged position. An arm 96 of the lever 90 is connected to the remainder (not shown) of the parking brake mechanism for actuation by the vehicle operator.

Figure 5:
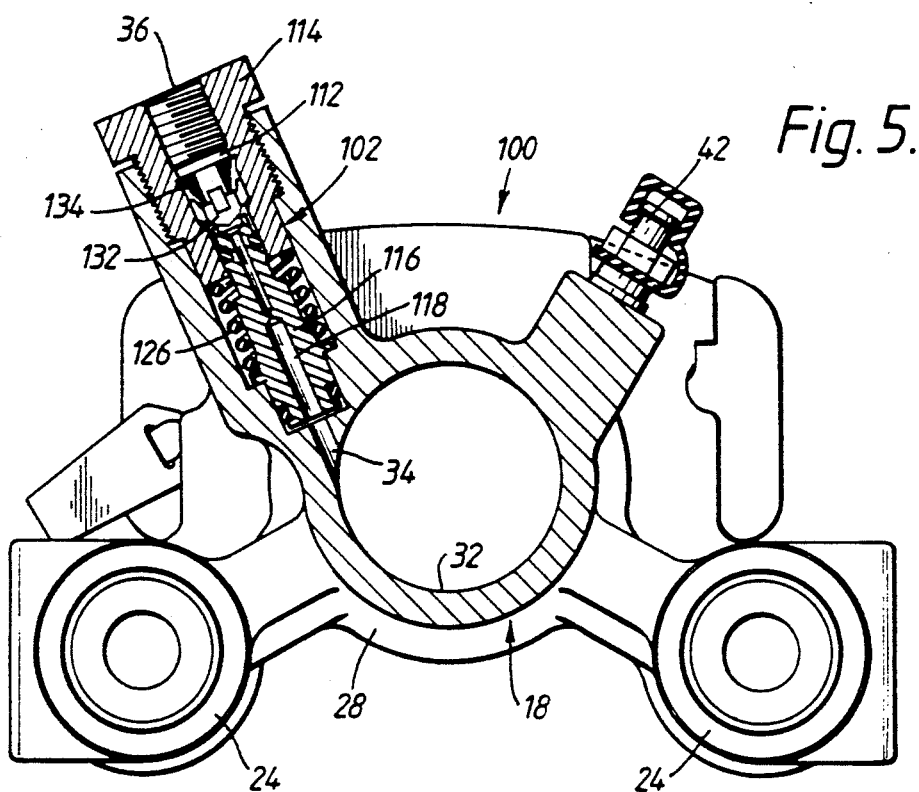
FIGS. 5 and 6 are similar views to FIGS. 3 and 4 respectively of a third embodiment of disc brake in accordance with the present invention.
Figure 6:
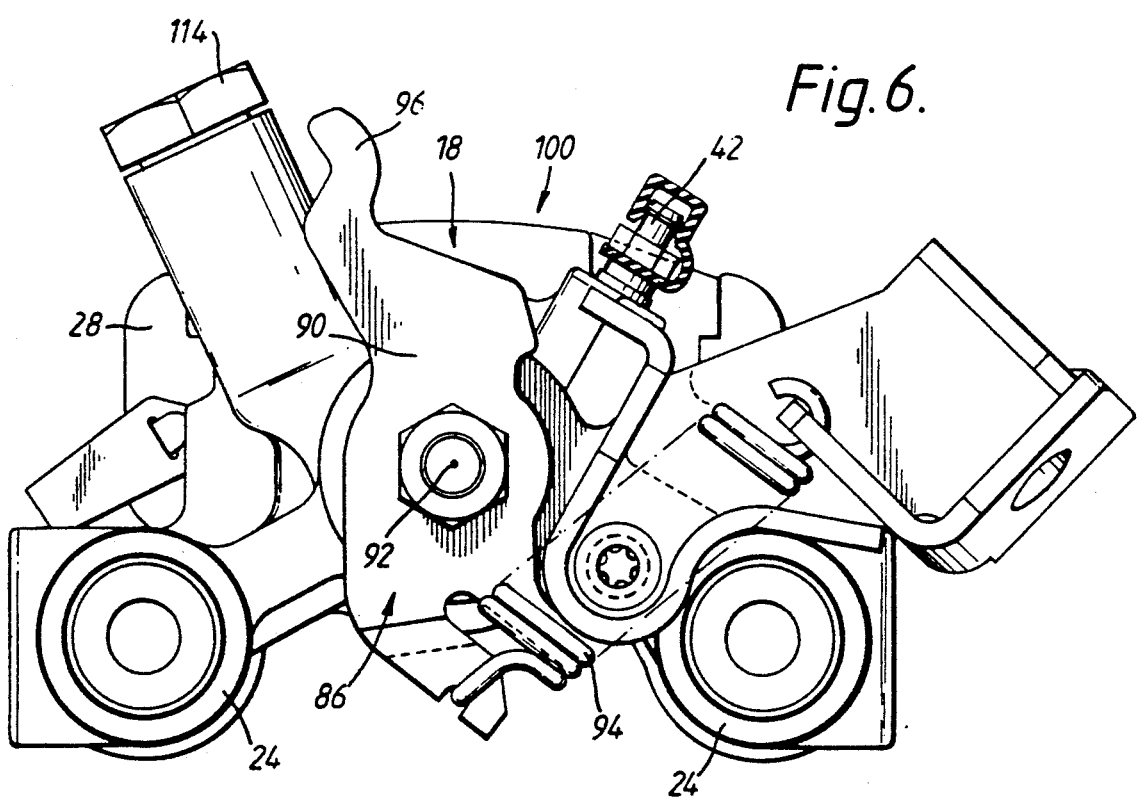

A third embodiment of disc brake 100 is shown in FIGS. 5 and 6. This third embodiment is very similar to the second embodiment shown in FIGS. 3 and 4, and like parts have been given the same reference numeral. In this third embodiment, a different type of proportioning valve 102 is used, which is shown in greater detail in FIG. 15. In this case, the proportioning valve 102, which is also of the pressure senstive type, is positioned in a stepped bore 104 in the fluid line 34. The stepped bore 104 comprises an input section 106, an outlet section 108, and an intermediary section 110 therebetween. The input section 106 has a smaller diameter than the outlet section 108, and the outlet section has a smaller diameter than the intermediary section 110. In this particular arrangement, the outlet section 108 and the intermediary section 110 are integrally formed in the caliper housing 28. The input section 106 is defined by a through bore 112 in an end cap 114 which is screw threaded to the caliper housing 28 after assembly of the proportioning valve 102. The end cap 114 has the fluid inlet 36 formed therein which is connected with the through bore 112.

Positioned in the stepped bore 104 is a valve piston 116 which is axially movable relative to the stepped bore. The valve piston 116 has a through bore 118 therethrough which provides a fluid passage between the fluid inlet 36 and the cylinder 32 of the caliper 28. 0-rings 120,122 respectively provide a fluid tight seal between the valve piston 116 and the input and outlet sections 106,108 of the stepped bore 104. The end 124 of the through bore 118 in the valve piston 116 which is positioned within the input section 106 of the stepped bore 104 defines a valve seat. A helical spring 126 is positioned in the intermediary section 110 of the stepped bore 104 between an end face 128 of the end cap 114 and an abutment shoulder 130 on the valve piston 116 to bias the valve piston away from the end cap. The abutment shoulder 130 is defined by an annular ring 131 on the valve piston 116 which abuts a shoulder 133 between the outlet section 108 and the intermediary section 110 of the stepped bore 104 during normal operation of the disc brake 100. Resiliently mounted in the input section 106 of the stepped bore 104 is a valve member 132 which is biased towards the valve seat of the valve piston 116 by a spring 134 to maintain the valve member in position. A shoulder 136 in the input section 106 provides an abutment for the valve member 132 to restrict the axial movement of the valve member relative to the stepped bore 104.

During normal operation of the disc brake 100, brake fluid can pass between the fluid inlet 36 and the cylinder 32 by way of the through bores 112 and 118. Initially, as the fluid pressure increases, the valve piston 116 remains stationary relative to the stepped bore 104. However, when the fluid pressure at the fluid inlet 36 reaches a predetermined level, the valve piston 116 is moved in the direction Y relative to the stepped bore 104 such as to compress the helical spring 126. This is due to the action of the fluid pressure on the end face 138 of the valve piston 116 within the outlet section 108 of the stepped bore 104 (which has a greater cross-sectional area than the end 118). The movement of the valve piston 116 brings the end 118 into engagement with the valve member 132 to close the proportioning valve 102, and hence prevent further increases in fluid pressure at the fluid inlet 36 being passed on to the cylinder 32. The predetermined fluid pressure at which the proportioning valve 102 closes can be determined from the relative cross-sectional areas of the ends 124,138 of the valve piston 116 and the strength of the helical spring 126, and adjusted accordingly, in a manner well known to those skilled in the art. With this arrangement, the risk of a wheel brake locking due to an excessively high fluid pressure in the cylinder 32 is substantially eliminated. When the fluid pressure at the fluid inlet 36 falls below the predetermined level, the valve piston 116 moves back in the opposite direction to the direction Y to open the proportioning valve 102.

Figure 7:
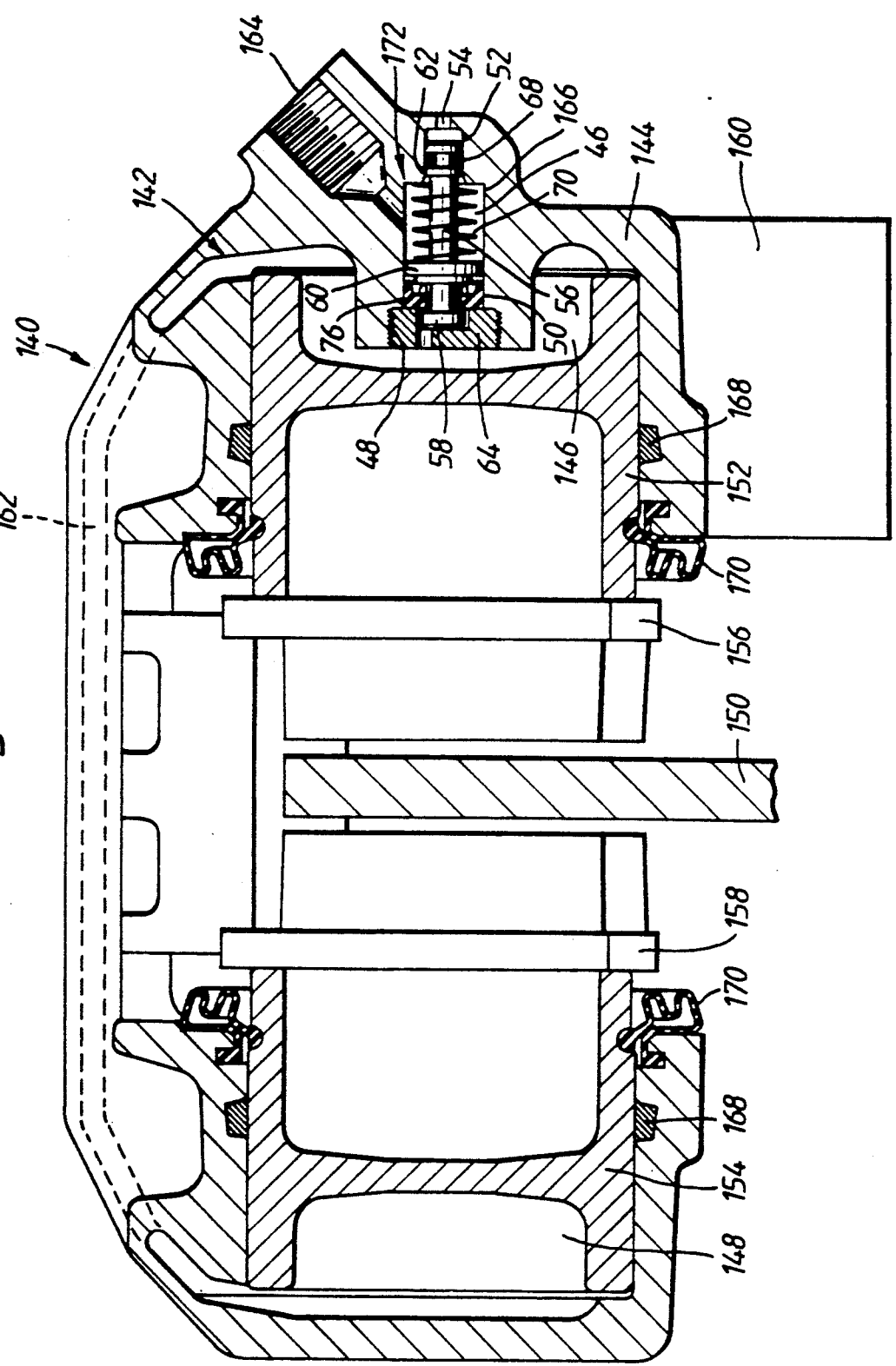

A fourth embodiment of disc brake 140 in accordance with the present invention is shown in FIG. 7. In this arrangement, the disc brake 140 comprises a caliper 142 which is of the fixed type. The caliper 142 comprises a caliper housing 144 having a cylinder 146,148 on either side of a rotor 150. Slidably mounted in each cylinder 146,148 is a piston 152,154 respectively, each of which act on brake pad 156,158 engageable with the rotor 150. Each cylinder 146,148 defines a single working chamber for each piston 152,154. The caliper 142 has a mounting bracket 160 for fixedly securing the caliper in position. A first fluid line 162 within the caliper housing 144 interconnects the cylinders 146,148 to ensure the same fluid pressure is applied to each cylinder. A second fluid line 166 connects one of the cylinders 146 with a fluid inlet 164. An elastomeric seal 168 between each piston 152,154 and the caliper housing 144 provide a fluid seal for each cylinder 146,148, and flexible boots 170 substantially prevent ingress of dirt into each cylinder.

The disc brake 140 as thus far described is well known, and its operation is also well known to those skilled in the art, and will not be described in detail. In use, pressurized brake fluid from a fluid pressure source (not shown) is introduced into the working chamber defined by the cylinders 146,148 by way of fluid inlet 164 and fluid lines 162,166. The pressurized brake fluid in the cylinders 146,148 causes the pistons 152,154 to move in an axial direction towards one another, which consequently urges the brake pads 156,158 into braking engagement with the rotor 150.

A proportioning valve 172 is positioned in the second fluid line 166. The proportioning valve 172 is the same as that shown in FIG. 13, and like parts have been given the same reference numeral.

The proportioning valve 172 acts to prevent brake fluid pressure above a predetermined level reaching the cylinders 146,148 in exactly the same way as described above. The proportioning valve 172 is assembled in position in the stepped bore 46 prior to the piston 152 being positioned in the cylinder 146.

A fifth embodiment of disc brake 174 in accordance with the present invention is shown in FIG. 8. The disc brake 174 comprises a rotor 176, inner and outer brake pads 178,180 respectively disposed on opposite sides of the rotor, and a caliper 182. In this embodiment, the caliper 182 is the moving or floating type and is slidably mounted on a support member (not shown) by way of sliding sleeves 184. The caliper 182 comprises a piston 186, a caliper housing 188 having an arm member 190 and a cylinder 192, and a fluid line 194. The fluid line 194 connects the cylinder 192 to a fluid inlet 196.

The cylinder 192 defines a single working chamber for the piston 186. The arm member 190 engages the outer brake pad 180. The piston 186 is slidably mounted in the cylinder 192 and engages the inner brake pad 178. An elastomeric seal 198 between the piston 186 and the caliper housing 188 provides a fluid seal for the cylinder 192, and a flexible boot 200 substantially prevents ingress of dirt into the cylinder.

The disc brake 174 as thus far described is well known, and its operation is also well known to those skilled in the art, and will not be described in detail. In use, pressurized brake fluid from a fluid pressure source (not shown) is introduced into the working chamber defined by the cylinder 192 by way of fluid inlet 196 and fluid line 194. The pressurized brake fluid in the cylinder 192 causes the piston 186 to move in an axial direction, which consequently urges the inner brake pad 178 into engagement with the rotor 176. By reactive force, the arm member 190 then moves the outer brake pad 180 into engagement with the rotor 176, such that the inner and outer brake pads 178,180 brakingly engage the rotor.

Figure 15:
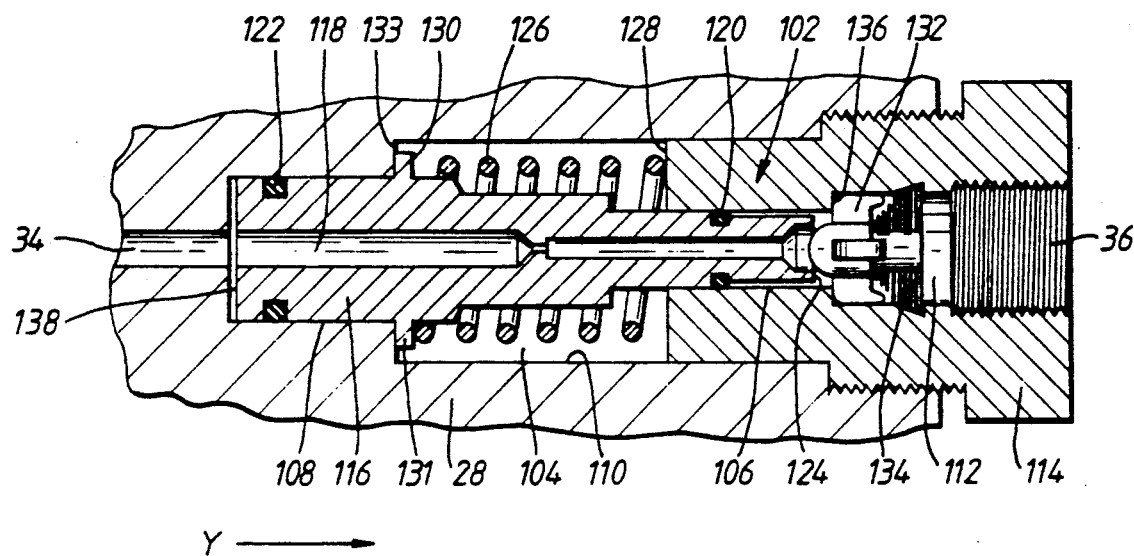
Figure 16:
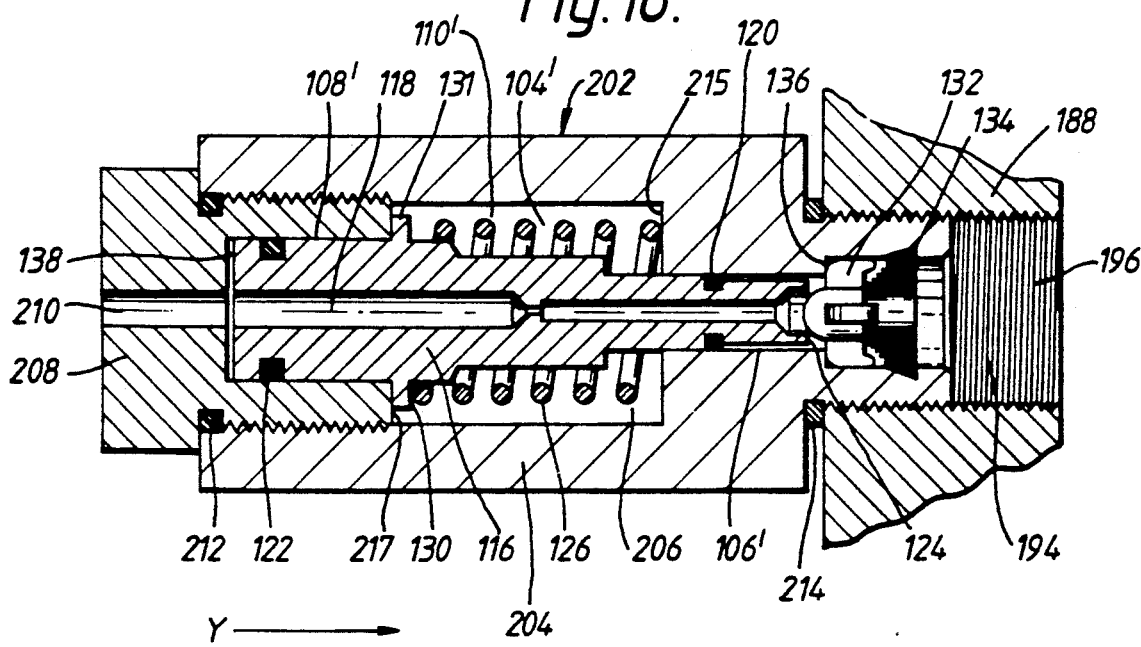

The disc brake 174 further comprises a proportioning valve 202 which is shown in more detail in FIG. 16 and which is very similar to the proportioning valve shown in FIG. 15, with like parts being given the same reference numeral. The proportioning valve 202 comprises a housing 204 which is screw threaded into the fluid line 194 and which extends into the cylinder 192. The housing 204 has a bore 206 extending therethrough which defines the input section 106' and the intermediary section 110, of the stepped bore 104'. An end cap 208 is screw threaded into the intermediary section 110' and has a bore 210 therethrough which defines the outlet section 108' of the stepped bore 104' and the outlet for the proportioning valve 202. An elastomeric seal 212 provides a fluid tight seal between the end cap 208 and the housing 204. A thrust washer 214 is positioned between the housing 204 and the caliper housing 188. The helical spring 126 extends between the abutment shoulder 130 on the valve piston 116 and a shoulder 215 between the intermediary section 110' and the input section 106' of the stepped bore 104'.

During normal operation of the disc brake 174, the annular ring 131 on the valve piston 116 abuts an end face 217 of the end cap 208. The operation of the proportioning valve 202 is the same as that of the proportioning valve 102 shown in FIG. 15 and described above. The proportioning valve 202 is assembled as a separate item, and then secured in place in the caliper 182 prior to the piston 186 being slid into position A sixth embodiment of disc brake 216 in accordance with the present invention is shown in FIG. 9. This embodiment is substantially the same as the fifth embodiment shown in FIG. 8, and like parts have been given the same reference numeral. In this embodiment, the housing 218 of the proportioning valve 220 is formed integrally with the caliper housing 188 and has a bore 222 therethrough which defines the intermediary section 110' of the stepped bore 104'. An insert member 224 makes a slide fit in the bore 222, and has a bore 226 therethrough which defines the input section 106' of the stepped bore 104'. The helical spring 126 extends between the abutment shoulder 130 on the valve piston 116 and an abutment face 228 on the insert member 224. The operation of the proportioning valve 220 is the same as that of the proportioning valves shown in FIGS. 15 and 16 and described above. The various elements of the proportioning valve 220 are assembled in position prior to the piston 186 being slid into position.

Figure 10:
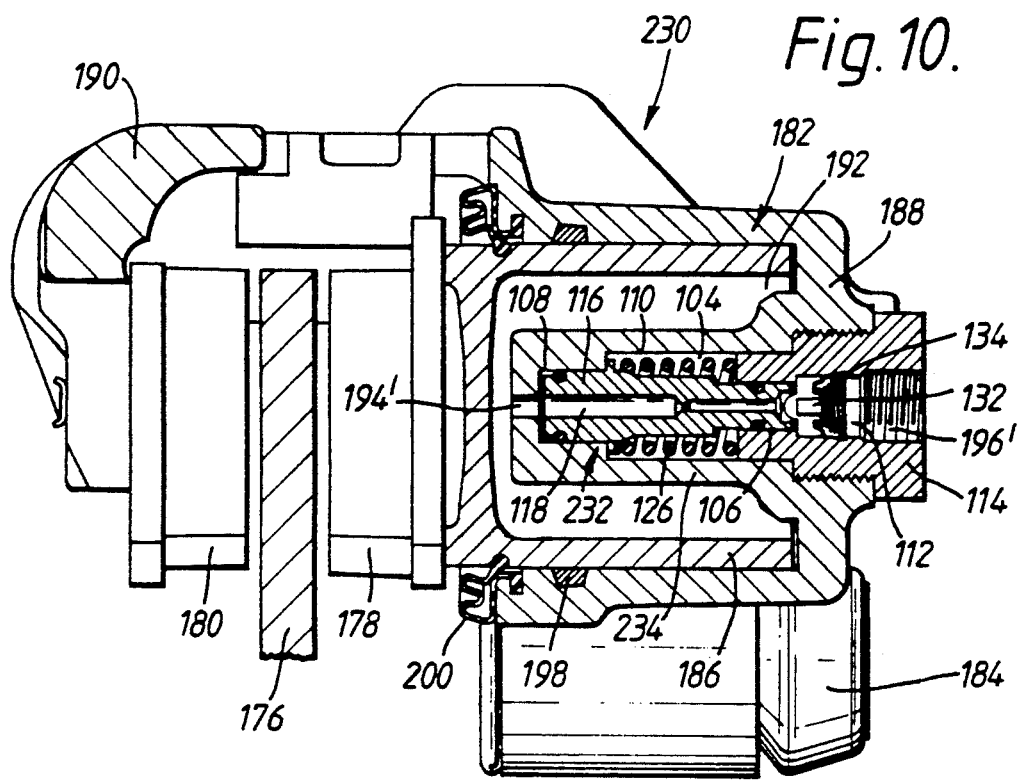

A seventh embodiment of disc brake 230 in accordance with the present invention is shown in FIG. 10. This embodiment is substantially the same as the sixth embodiment shown in FIG. 9, and like parts have been given the same reference numeral. In this embodiment, the proportioning valve 232 is substantially the same as that shown in FIG. 15, and like parts have been given the same reference numeral. In this case, the stepped bore 104 is defined by an integral extension 234 of the caliper housing 188 which projects into the cylinder 192, and the fluid line 194' and the fluid inlet 196' are the same as the fluid line 34 and fluid inlet 36 respectively shown in FIG. 15. The operation of the proportioning valve 232 is substantially the same as that described above with reference to FIGS. 15 and 16, and its assembly is the same as that described above with reference to FIG. 15.

Figure 11:
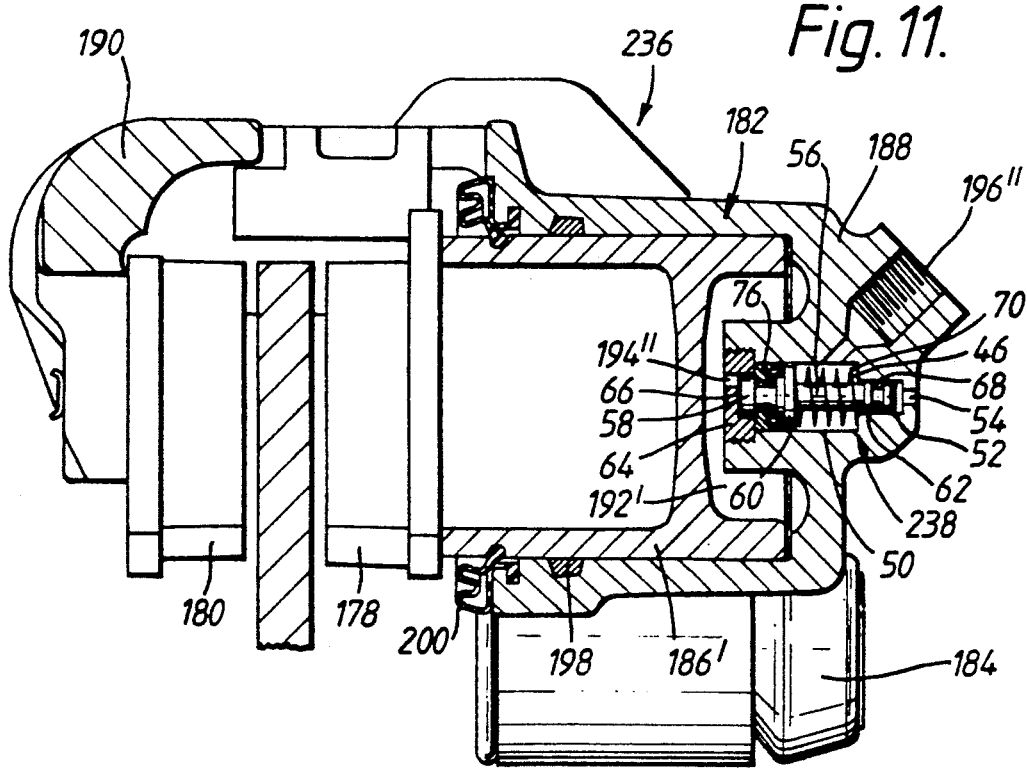

An eighth embodiment of disc brake 236 in accordance with the present invention is shown in FIG. 11. This embodiment is substantially the same as the sixth embodiment shown in FIG. 9, and like parts have been given the same reference numeral. In this embodiment, the proportioning valve 238 is substantially the same as that shown in FIG. 13, and like parts have been given the same reference numeral. In this case, the piston 186' is a different shape in order to minimise the size of the cylinder 192', and the fluid line 194" and the fluid inlet 196" are the same as the fluid line 34 and fluid inlet 36 respectively shown in FIG. 13. The operation of the proportioning valve 238 is substantially the same as that described above with reference to FIGS. 13 and 14, and its assembly is the same as that described above with reference to FIG. 13.

Figure 12:
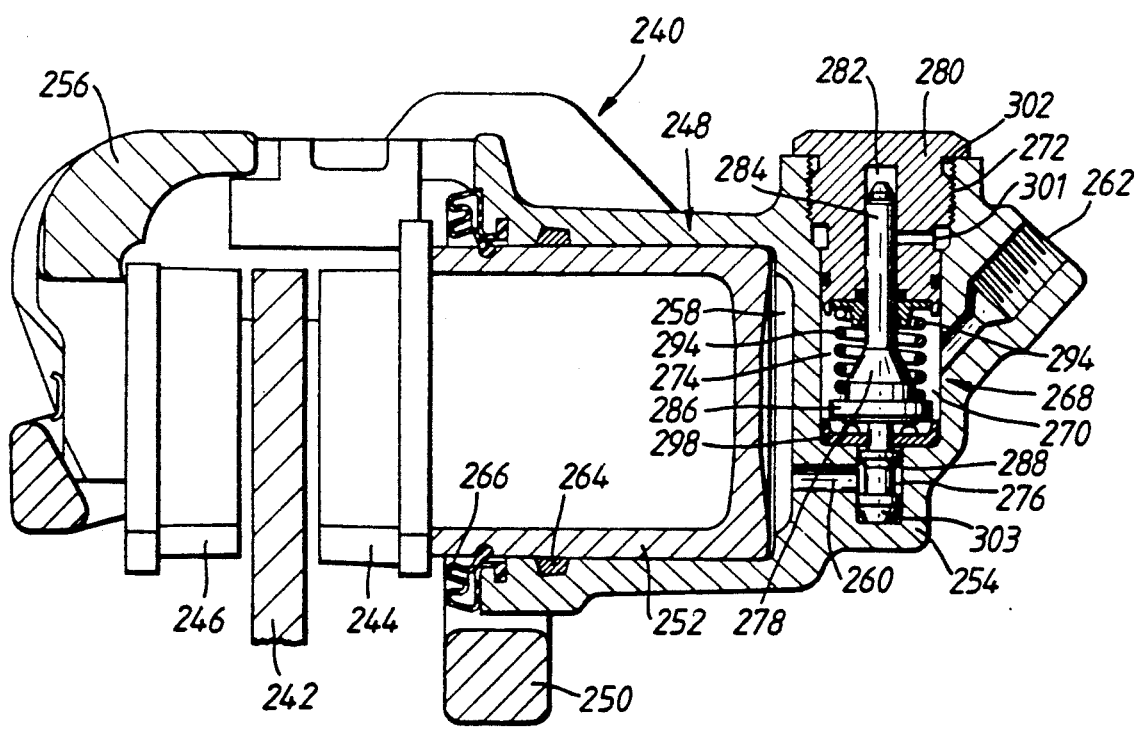

A disc brake 240 in accordance with a ninth embodiment of the present invention is shown in FIG. 12. The disc brake 240 comprises a rotor 242, inner and outer brake pads 244,246 respectively disposed on opposite sides of the rotor, and a caliper 248. In this embodiment, the caliper 248 is the moving or floating type and is slidably mounted on a support member (not shown) by way of mounting brackets 250. The caliper 248 comprises a piston 252, a caliper housing 254 having an arm member 256 and a cylinder 258, and a fluid line 260. The fluid line 260 connects the cylinder 258 to a fluid inlet 262. The cylinder 258 defines a single working chamber for the piston 252. The arm member 256 engages the outer brake pad 246. The piston 252 is slidably mounted in the cylinder 258 and engages the inner brake pad 244.

An elastomeric seal 264 between the piston 252 and the caliper housing 254 provides a fluid seal for the cylinder 258, and a flexible boot 266 substantially prevents ingress of dirt into the cylinder.

The disc brake 240 as thus far described is well known, and its operation is also well known to those skilled in the art, and will not be described in detail. In use, pressurized brake fluid from a fluid pressure source (not shown) is introduced into the working chamber defined by the cylinder 258 by way of fluid inlet 262 and fluid line 260. The pressurized brake fluid in the cylinder 258 causes the piston 252 to move in an axial direction, which consequently urges the inner brake pad 244 into engagement with the rotor 242. By reactive force, the arm member 256 then moves the outer brake pad 246 into engagement with the rotor 242, such that the inner and outer brake pads 244,246 provide braking engagement with the rotor.

Figure 17:
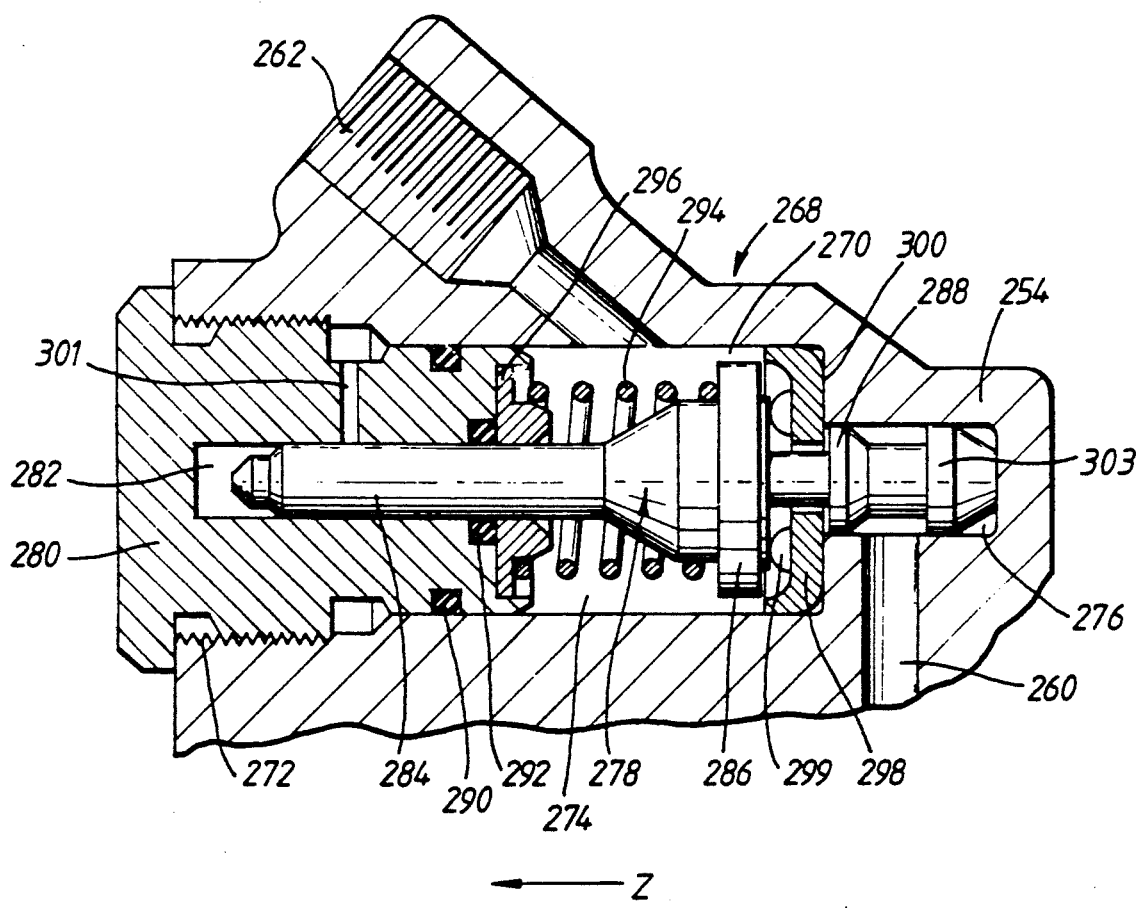

A proportioning valve 268 is positioned in a stepped bore 270 in the fluid line 260 in the caliper housing 254 between the fluid inlet 262 and the cylinder 258. The proportioning valve 268, which is of the pressure sensitive type, is shown in greater detail in FIG. 17. The stepped bore 270 has three sections 272,274,276, with the first section 272 having a larger diameter than the second section 274, and with the second section having a larger diameter than the third section 276. The third section 276 is fluidly connected to the cylinder 258. The second section 274 is fluidly connected to the fluid inlet 262. The second and third section 274,276 both define a portion of the fluid line 260 in the caliper housing 254. A valve piston 278 extends through the three sections 272,274,276 of the stepped bore 270. An end cap 280 closes the first section 272 of the stepped bore 270, and has a bore 282 therein which opens into the second section 274 of the stepped bore 270, and which is connected to atmospheric pressure by passage 301. The valve piston 278 has a shaft portion 284 which makes a sliding fit in the closed bore 282, a first disc portion 286 positioned in the second section 274 of the stepped bore 270, a second disc portion 288 which makes a sliding fit in the third section 276 of the stepped bore, and a third disc portion 303 which also makes a sliding fit in the third section 276. The diameters of the shaft portion 284 and the disc portions 286,288,303 are such as to allow the valve piston 278 to move axially relative to the stepped bore 270. The diameter of the second and third disc portions 288,303 is greater than the diameter of the shaft portion 284. Elastomeric seals 290,292 are positioned between the end cap 280 and the caliper housing 254, and between the end cap and the shaft portion 284 respectively to form a fluid tight seal for the fluid line 260. A helical spring 294 is positioned in the second section 274 of the stepped bore 270 between a spring cage 296 which abuts the end cap 280 and one side of the first disc portion 286. Positioned on the other side of the first disc portion 286 within the second section 274 of the stepped bore 270 is an elastomeric cup seal 298. The first disc portion 286 abuts spaced raised portions 299 of the elastomeric cup seal 298 under the action of the helical spring 294. The elastomeric cup seal 298 is positioned in the second section 274 of the stepped bore 270 between the first disc portion 286 and a shoulder 300 between the second and third section 274,276 of the stepped bore. The elastomeric cup seal 298 defines a valve seat engageable by a valve member defined by the second disc portion 288 of the valve piston 278.

During normal operation of the disc brake 240, brake fluid can pass between the fluid inlet 262 and the cylinder 258 by way of the second and third sections 274,276 of the stepped bore 270. Initially, as the fluid pressure increases, the valve piston 278 remains stationary relative to the stepped bore 270. However, when the fluid pressure at the fluid inlet 262 reaches a predetermined level, the valve piston 278 is moved in a direction Z relative to the stepped bore 270 such as to compress the helical spring 294. This is due to the action of the fluid pressure on the third disc portion 303. The movement of the valve piston 278 brings the second disc portion 288 into engagement with the elastomeric cup seal 298 to provide a substantially fluid tight seal between the fluid inlet 262 and the cylinder 258 to prevent further increases in fluid pressure at the fluid inlet being passed on to the cylinder. The predetermined fluid pressure at which the proportioning valve 268 closes can be determined from the diameters of the second and third disc portions 288,303 and the shaft portion 284, and the strength of the helical spring 294, and adjusted accordingly, in a manner well known to those skilled in the art.

With this arrangement, the risk of a wheel brake locking due to an excessively high fluid pressure in the cylinder 258 is substantially eliminated. Excess fluid pressure generated in the cylinder 258 due to thermal expansion, etc. is relieved by seepage of brake fluid passed the outer periphery of the elastomeric cup seal 298 into the second section 274 of the stepped bore 270. Passage of brake fluid in the other direction is prevented by the design of the elastomeric cup seal 298. When the fluid pressure at the fluid inlet 262 falls below the predetermined level, the valve piston 278 moves back in the opposite direction to the direction Z to open the proportioning valve 268.

In the arrangement shown in FIG. 12, the first section 272 of the stepped bore 270 extends to an external opening 302 in the caliper housing 254, and the end cap 280 together with elastomeric seals 290,292 sealingly close the opening after assembly of the proportioning valve 268 in the stepped bore 270, the end cap being screw threaded into position.

In the various embodiments described above, a single working chamber is provided for the or each piston of each disc brake. Further, a single proportioning valve integral with the caliper can limit the fluid pressure in the or each working chamber of each disc brake.

Whilst the above embodiments have all been described as having proportioning valves which are of the pressure sensitive type, it will be appreciated that the present invention also covers disc brakes having a load and height sensitive proportioning valve or an inertia sensitive proportioning valve.

Further, the proportioning valve may act to prevent fluid pressure above the predetermined level reaching the working chamber or chambers (as described above), or may act to limit or restrict the flow of brake fluid to the working chamber or chambers when the fluid pressure from the fluid pressure source exceeds the predetermined level. The various types of proportioning valve are well known to those skilled in the art.

It will be understood by those skilled in the art that the fluid pressure source is typically a master cylinder, with or without a pressure booster, which is actuated by a vehicle operator.

Attention is drawn to our corresponding patent application Ser. No. 07/624,370, filed the same day as the present application.

We claim:

1. A disc brake for a motor vehicle comprising:

a rotor;

inner and outer brake pads disposed on opposite sides of the rotor and movable into braking engagement therewith;

a caliper comprising a piston for urging one of the brake pads against the rotor, a caliper housing having a cylinder positioned on one side of the rotor within which the piston is slidably movable under action of fluid pressure in the cylinder, the cylinder defining a single working chamber for the piston, and a fluid line in the caliper for supplying fluid from a fluid pressure source to the cylinder for movement of the piston; and a hydro-mechanically actuated proportioning valve in the fluid line and integral with the caliper for limiting the fluid pressure acting on the piston when the fluid pressure from the fluid pressure source exceeds a predetermined level, the proportioning valve comprising a housing which makes a screw-threaded connection with the caliper housing extending into the cylinder of the caliper housing.

2. A disc brake for a motor vehicle comprising:

a rotor;

inner and outer brake pads disposed on opposite sides of the rotor and movable into braking engagement therewith;

a caliper comprising a piston for urging one of the brake pads against the rotor, a caliper housing having a cylinder positioned on one side of the rotor within which the piston is slidably movable under action of fluid pressure in they cylinder, the cylinder defining a single working chamber for the piston, and a fluid line in the caliper for supplying fluid from a fluid pressure source to the cylinder for movement of the piston; and a hydro-mechanically actuated proportioning valve which closes when the fluid pressure in the cylinder exceeds a predetermined level, the proportioning valve being in the fluid line and integral with the caliper for limiting the fluid pressure acting on the piston when the fluid pressure from the fluid pressure source exceeds a predetermined level, and wherein the proportioning valve comprises a stepped bore; a valve seat positioned within the stepped bore; a valve member engageable with the valve seat to close the proportioning valve; a valve piston positioned in the stepped bore and axially movable relative thereto, the valve piston having the valve member integral therewith; and a spring for biasing the valve piston to the open position of the proportioning valve, and wherein the valve seat is defined by an elastomeric cup seal.

3. A disc brake for a motor vehicle comprising:

a rotor;

inner and outer brake pads disposed on opposite sides of the rotor and movable into braking engagement therewith, a caliper comprising a piston for urging one of the brake pads against the rotor, a caliper housing having a cylinder positioned on one side of the rotor within which the piston is slidably movable under action of fluid pressure in the cylinder, the cylinder defining a single working chamber for the piston, and a fluid line in the caliper for supplying fluid from a fluid pressure source to the cylinder for movement of the piston, and a hydro-mechanically actuated proportioning valve which closes when the fluid pressure int he cylinder exceeds a predetermined level, the proportioning valve being in the fluid line and integral with the caliper for limiting the fluid pressure acting on the piston when the fluid pressure from the fluid pressure source exceeds a predetermined level, and wherein the proportioning valve comprises a stepped bore, the stepped bore with an input section, outlet section and intermediary section, the input section having a smaller diameter than the outlet section, the outlet section having a smaller diameter than the intermediary section; a valve member positioned within the fluid line; a valve seat engageable with the valve member to close the proportioning valve; a valve piston positioned int he stepped bore and axially movable relative thereto, the valve piston being sealed along the input and output sections from the intermediary section, the valve piston having the valve seat integral therewith and the valve piston having a through bore providing a fluid passage between the fluid pressure source and the caliper housing cylinder; and a spring for biasing the valve piston to the open position of the proportioning valve.

* * * * *